United States Patent [19]
Campos et al.

[11] Patent Number: 5,853,784
[45] Date of Patent: Dec. 29, 1998

[54] STABILISATION OF FLAVORS

[75] Inventors: Marcos Pery Campos, Rio de Janeiro, Brazil; Rosemary Elizabeth O'Reilly, Eastleigh, England

[73] Assignee: British-American Tobacco Company Limited, Middlesex, England

[21] Appl. No.: 930,705

[22] PCT Filed: Apr. 30, 1996

[86] PCT No.: PCT/GB96/01028

§ 371 Date: Oct. 16, 1997

§ 102(e) Date: Oct. 16, 1997

[87] PCT Pub. No.: WO96/34540

PCT Pub. Date: Nov. 7, 1996

[30]  Foreign Application Priority Data

May 5, 1995 [GB] United Kingdom .................. 9509109

[51] Int. Cl.[6] ........................................................ A23L 1/22
[52] U.S. Cl. ........................................... 426/536; 426/536
[58] Field of Search ....................................... 426/534, 535, 426/536, 650

[56]  References Cited

U.S. PATENT DOCUMENTS

| | | | |
|---|---|---|---|
| 3,765,903 | 10/1973 | Clarke et al. | 99/50.5 |
| 3,956,513 | 5/1976 | Clarke et al. | 426/271 |
| 4,395,431 | 7/1983 | Lance et al. | 426/600 |

FOREIGN PATENT DOCUMENTS 0 311 330  4/1989  European Pat. Off. .

*Primary Examiner*—Nina Bhat
*Attorney, Agent, or Firm*—Kane, Dalsimer, Sullivan, Kurucz, Levy, Eisele and Richard

[57] ABSTRACT

Volatile flavour molecules having a particular cyclic enolone structure are stabilised by complexation with alkaline earth metal ions. These complexes are stable until exposed to certain conditions of temperature and/or moisture.

21 Claims, 1 Drawing Sheet

STABILISATION OF FLAVORS

BACKGROUND OF THE INVENTION

CROSS-REFERENCE TO RELATED APPLICATION

This application is a national stage application filed under 35 USC 371 of PCT/GB96/01028.

1. Field of the Invention

The subject invention relates to the stabilisation of flavours.

2. Brief Description of Related Art

It is well known to enhance the flavour and/or aroma of tobacco (or tobacco smoke) and foodstuffs, and a variety of flavourants have been developed for such purposes. Examples of commonly used flavourants include vanillin and menthol and derivatives thereof. It would be desirable to use as flavourants other compounds including furaneol and cyclotene. However, these latter compounds have a high volatility and are often unstable in their standard form. Therefore it is not practical to use these compounds in products as this will result in, for example, a reduced shelf-life of the product due to volatilisation of the compound during storage.

There have been many attempts to provide means whereby volatile flavourants are prevented from volatilising at ambient temperatures and released only when exposed to high temperatures. One example of such an attempt is the stabilisation of a flavour molecule by the formation of a complex, wherein the flavourant forms an inclusion complex with a "host" compound. This method of stabilisation is illustrated by U.S. Pat. No. 3,047,431, U.S. Pat. No. 3,288,146 and EP 0 503 795 A2. Formation of an inclusion complex involves the host compound forming around the guest (flavour) molecule. The Van der Waals forces which form between the host molecule and the guest molecule cause a reduction of energy in the inclusion complex and therefore the flavour is stabilised. A disadvantage of this method of stabilisation is that in a mixture of different flavour molecules, certain molecules may be stabilised in preference to others depending upon the structure of the host and guest molecules.

Another method of stabilising flavourants is to encapsulate the flavour molecules in such a manner that they are not released from the capsule unless subjected to either heat or pressure. This method of stabilisation is taught in U.S. Pat. No. 3,162,199 and U.S. Pat. No. 3,550,598. This method of stabilisation is not specific and can be used to stabilise all types of flavourants.

Both of the above methods of stabilising flavours involve a physical restriction of the molecules. In effect the flavourant is held in a surrounding structure until the flavourant is released by exposure of the structure to certain conditions. There is no chemical reaction between the flavourant and the stabilising compound in either case.

The subject invention provides an alternative mode of stabilisation, which alternative mode involves chemical reaction with the flavourant.

An article published in the Journal of Organic Chemistry in 1993 at pages 7557–7561 describes development work for the purpose of improving methods of purification of phenacyl alcohol using calcium complexation. The subject matter of the article is to be considered as incorporated herein.

SUMMARY OF THE INVENTION

The subject invention provides a stable flavour complex comprising an alkaline earth metal ion and two cyclic molecules, wherein for each of said molecules the cyclic ring thereof comprises first and second functional groups, which functional groups are located at adjacent positions of the cyclic ring, each of which functional groups provides a bond with said ion, said cyclic ring further comprises a double bond, which double bond is in conjugated relationship with said second functional group, and one at least of said cyclic molecules being a flavour molecule.

BREIF DESCRIPTION OF THE DRAWINGS

The drawing is a structural representation of a complex of the invention.

DETAILED DESCRIPTION OF THE PREFERRED EMBODIMENTS OF THE INVENTION

Preferably both of the cyclic molecules of the flavour complex are molecules of a flavour compound.

Preferably the alkaline earth metal ion is a calcium ion. The alkaline earth metal ion is suitably provided by a water soluble salt. A suitable calcium salt is $CaCl_2$, and is advantageously anhydrous $CaCl_2$.

The subject invention further provides a method of producing a stable flavour complex, wherein an alkaline earth metal salt and a cyclic flavour compound, are reacted together in solution, said stable flavour complex being extracted from the reaction mixture by means of a separation technique, the cyclic molecules comprising first and second functional groups, which functional groups are located at adjacent positions of the cyclic ring, and the ring of each cyclic molecule further comprising a double bond in a conjugated relationship with said second functional group.

It is envisaged that a non-flavour cyclic compound may additionally be present in the reaction mixture.

The alkaline earth metal salt is preferably a soluble salt and is, suitably, a water soluble salt, for example calcium chloride. Advantageously the salt is in the form of an anhydrous salt.

Preferably, the reaction between the alkaline earth metal salt and the cyclic compound takes place under reflux conditions.

Suitable solvents providing the solution required for reflux include both protic solvents, e.g., ethanol, and aprotic solvents, e.g. tetrachloromethane. Preferably the solvent is dried (dehydrated) prior to reaction. Particularly suitable solvents include absolute ethanol and absolute methanol.

The cyclic molecules may be heterocyclic molecules or homocyclic molecules.

The first functional group comprises either an alcohol group or a thiol group.

The second functional group preferably comprises either doubly bonded oxygen or doubly bonded sulphur.

If the cyclic molecule is a heterocyclic molecule, the heterocyclic ring may contain oxygen, sulphur or nitrogen or derivatives of nitrogen.

The cyclic ring may also comprise side chains, for example, of alkyl groups or alkyl derivatives.

Suitable heterocyclic compounds include, furaneol, norfuraneol, maltol, iso maltol, ethyl maltol and maple lactone.

A suitable homocyclic molecule is cyclotene.

Figure 1:
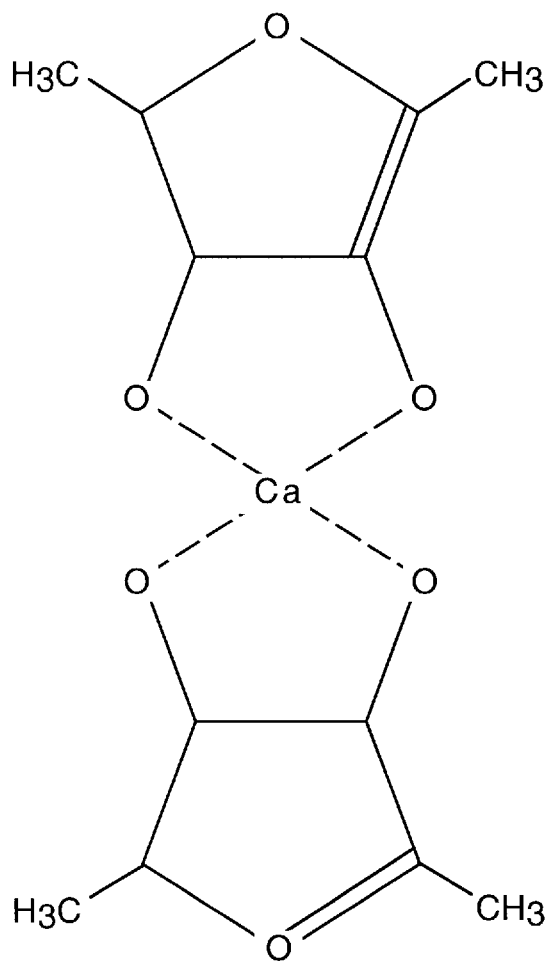
Figure 1:
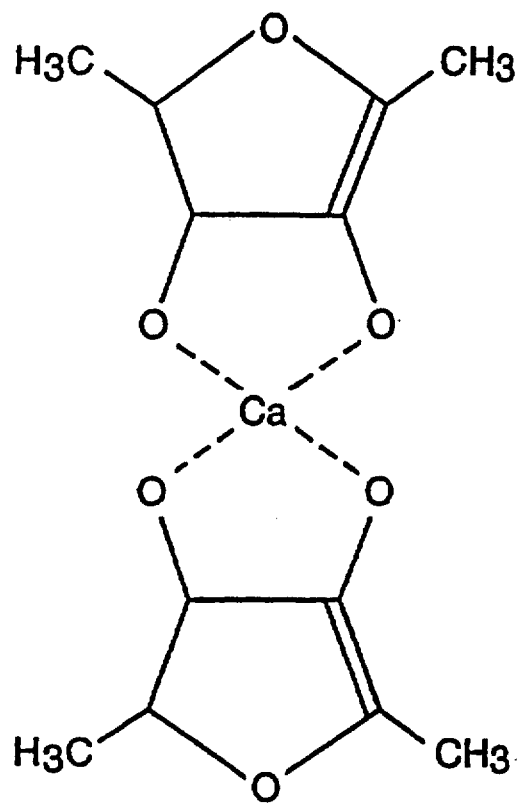

Complexation occurs because of the nature of the methyl enolone configuration. Consider, for example, furaneol as the flavour compound reacting with ionic calcium chloride. The hydrogen of the alcohol group of the furaneol is constantly moving between the oxygen of the alcohol group and the oxygen of the ketone group. This corresponds with the simultaneous movement of the electrons of the oxygen double bond between the ketone group and the alcohol group. When the cyclic molecule comes into contact with the ionic calcium the hydrogen of the alcohol group of the cyclic molecule is displaced and dative bonds form between the calcium ion and the oxygen atoms of each of ketone and alcohol groups of the flavour compound, thereby stabilising the flavour compound. The double positive charge of the calcium ion means that each calcium ion can stabilise two cyclic molecules. Therefore, the complex preferably comprises a calcium ion between two cyclic molecules, as shown in FIG. 1.

If the two cyclic molecules in a complex are both flavour molecules, the two flavour molecules may be either two of the same flavour molecules or two different flavour molecules. The particular identity of the flavour molecules of the complex, and the combination thereof, will determine the flavour and/or aroma properties released upon exposure of the stabilised flavour complex to moisture and/or heat. For example, if the flavour molecules contain no nitrogen or sulphur then the flavour produced will be sweet. Complexes as per the subject invention may have aromas/flavours of coffee, bread or meat products, for example.

A first stabilised flavour complex comprising two of the same flavour molecules, and a second stabilised flavour complex also comprising two of the same flavour molecules, the second stabilised flavour complex comprising different flavour molecules from that of the first stabilised flavour complex, may be mixed to produce a specific flavour/aroma which will be released upon exposure to moisture and/or heat.

A stabilised flavour complex according to the present invention may be incorporated into a smoking article. For example, the complex may be incorporated into the filter, the tobacco blend or applied to the wrapper of the smoking article. The method of incorporation may proceed according to any suitable method known in the art.

A stabilised flavour complex according to the present invention may also be applied to or incorporated in dehydrated foodstuffs or beverages; examples are meat products and coffee. The complex is suitably applied to/incorporated in microwaveable meat products such as beefburgers, wherein the flavour/aroma will be released upon cooking, and instant coffee, wherein the flavour/aroma will be released upon contact with boiling water. Complexes of the subject invention are particularly useful in applications where a roasted or toasted flavour/aroma is required upon cooking. The method of incorporation of the stabilised flavour complex in the foodstuff/beverage will vary depending upon the nature of the foodstuff/beverage and any suitable method known in the art may be employed.

An advantage of the flavour complex stabilised in accordance with the subject invention when incorporated into a smoking article is that the flavour/aroma will not be released until the product is exposed to moisture and/or heat, i.e. upon smoking of, for example, a cigarette.

Another advantage of the invention resides in the fact that the stabilised molecules are not only stabilised in the respect that they are less volatile, but the molecules are also stabilised in the sense that they will not react with compounds in the material in which they are incorporated.

Stabilisation of flavour compounds as described with respect to the subject invention also prevents ring opening reactions of the flavour molecules.

The following examples are further illustrative of the subject invention. The specific ingredients and process parameters are presented as being typical, and various modifications can be derived in view of the foregoing disclosure.

EXAMPLE 1

Maltol was refluxed in anhydrous absolute ethanol for four hours in the presence of anhydrous calcium chloride. The ratio of anhydrous calcium chloride to maltol was 1:2. After reflux the reaction mixture was concentrated to about a quarter of the original volume by bubbling nitrogen gas through the surface of the mixture. In order to separate out the product, pentane was added to the concentrated reaction mixture. The volume of pentane added to the reaction mixture was approximately equal to the volume of the concentrated reaction mixture. The mixture was left to cool for about twelve hours at around 4° C., whereby the product crystallised out from the reaction mixture. The crystalline product was filtered and stored in a desicator.

EXAMPLE 2

Cyclotene was processed substantially according to the procedure given in Example 1. However, in this case, the reaction mixture was concentrated until it was almost dry. Pentane was then added as in Example 1. The mixture was left to cool at 4° C. for in excess of twelve hours.

An alternative method of crystallisation involves drying out the reaction mixture followed by re-dissolving in a small amount of a 1 to 1 mixture of ethanol and pentane. Crystallisation will occur when the mixture is left to stand at around 4° C.

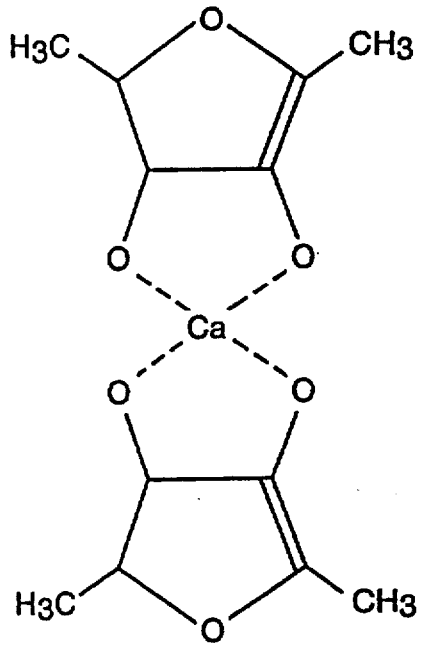

We claim:

1. A stable flavour complex, comprising an alkaline earth metal ion and two cyclic molecules, wherein for each of said molecules the cyclic ring thereof comprises first and second functional groups, which functional groups are located at adjacent positions of the cyclic ring each of which functional groups provides a bond with said ion, said cyclic ring further comprises a double bond in a conjugated relationship with said second functional group, and one at least of said cyclic molecules being a flavour molecule, said flavour molecule being released upon exposure of said flavour complex to moisture and/or heat.

2. A complex as claimed in claim 1, wherein said two cyclic molecules are both flavour molecules.

3. A complex as claimed in claim 2, wherein the two flavour molecules are two different flavour molecules.

4. A complex as claimed in any one of claims 1, wherein said first functional group comprises either an alcohol group or a thiol group.

5. A complex as claimed in claim 1, wherein said second functional group comprises either doubly bonded oxygen or doubly bonded sulphur.

6. A complex as claimed in claim 1, wherein the cyclic ring comprises side chains of alkyl groups or alkyl derivatives.

7. A complex as claimed in claim 1, wherein said cyclic molecule is a heterocyclic molecule and said heterocyclic ring comprises oxygen, sulphur, nitrogen or nitrogen derivatives.

8. A complex as claimed in claim 7, wherein said heterocyclic molecule is any one or more selected from the group consisting of furaneol, nor furaneol, maltol, iso maltol, ethyl maltol and maple lactone.

9. A complex as claimed in claim 1, wherein said cyclic molecule is cyclotene.

10. A complex as claimed in claim 1, wherein said alkaline earth metal ion is a calcium ion.

11. A complex as claimed in claim 1 wherein the alkaline earth metal ion is in the form of a water soluble salt.

12. A complex as claimed in claim 11, wherein the alkaline earth metal salt is anhydrous calcium chloride.

13. A method of stabilising volatile flavour compounds, wherein an alkaline earth metal ion and two volatile cyclic molecules, are reacted together in solution, at least one of said cyclic molecules being a flavour molecule, a stable flavour complex being extracted from the reaction mixture by means of a separation technique, said cyclic molecules comprising first and second functional groups, which functional groups are located at adjacent positions of the cyclic ring, and said ring of each cyclic molecule further comprising a double bond in a conjugated relationship with said second functional group and said flavour molecule being released upon exposure of said flavour complex to moisture and/or heat.

14. A method as claimed in claim 13, wherein said flavour compound, comprises any one or more of the group consisting of cyclotene, maltol, iso maltol, furaneol, maple lactone and nor furaneol.

15. A method as claimed in claim 13, wherein said cyclic molecules are a mixture of flavour molecules and non-flavour molecules.

16. A method as claimed in claims 13, wherein said cyclic molecules are a mixture of two different flavour compounds.

17. A method as claimed in claim 13, wherein said alkaline earth metal salt and said cyclic molecules are in anhydrous solution.

18. A method as claimed in claim 13, wherein. a. suitable solvent is absolute ethanol or absolute methanol.

19. A smoking article comprising a stable flavour complex, said stable flavour complex being as claimed in claims 1.

20. A foodstuff comprising a stable flavour complex, said stable flavour complex being as claimed in claim 1.

21. A beverage comprisng a stable flavour complex, said stable flavour complex being as claimed in claim 1.

* * * * *

UNITED STATES PATENT AND TRADEMARK OFFICE
CERTIFICATE OF CORRECTION

PATENT NO. : 5,853,784
DATED : Dec. 29, 1998
INVENTOR(S) : Marcos Pery Campos, et al It is certified that error appears in the above-identified patent and that said Letters Patent is hereby corrected as shown below:

The title page, showing the illlustrative figure, should be deleted and substitute therefor the attached title page.

The drawing sheet, consisting of Fig. 1, should be deleted to be replaced with the drawing sheet, consisting of Fig. 1, as shown on the attached page.

Signed and Sealed this

Twenty-eighth Day of September, 1999

*Attest:*

Q. TODD DICKINSON

*Attesting Officer*  *Acting Commissioner of Patents and Trademarks*

United States Patent

Campos et al.

Patent Number: 5,853,784
Date of Patent: Dec. 29, 1998

[54] STABILISATION OF FLAVORS

[75] Inventors: Marcos Pery Campos, Rio de Janeiro, Brazil; Rosemary Elizabeth O'Reilly, Eastleigh, England

[73] Assignee: British-American Tobacco Company Limited, Middlesex, England

[21] Appl. No.: 930,705
[22] PCT Filed: Apr. 30, 1996
[86] PCT No.: PCT/GB96/01028
 § 371 Date: Oct. 16, 1997
 § 102(e) Date: Oct. 16, 1997
[87] PCT Pub. No.: WO96/34540
 PCT Pub. Date: Nov. 7, 1996

[30] Foreign Application Priority Data

May 5, 1995 [GB] United Kingdom ............ 9509109

[51] Int. Cl.$^6$ .................................................. A23L 1/22
[52] U.S. Cl. ........................................ 426/536; 426/536
[58] Field of Search .................................. 426/534, 535, 426/536, 650

[56] References Cited

U.S. PATENT DOCUMENTS

| | | | |
|---|---|---|---|
| 3,765,903 | 10/1973 | Clarke et al. | 99/50.5 |
| 3,956,513 | 5/1976 | Clarke et al. | 426/271 |
| 4,395,431 | 7/1983 | Lance et al. | 426/600 |

FOREIGN PATENT DOCUMENTS 0 311 330  4/1989  European Pat. Off.

Primary Examiner—Nina Bhat
Attorney, Agent, or Firm—Kane, Dalsimer, Sullivan, Kurucz, Levy, Eisele and Richard

[57] ABSTRACT

Volatile flavour molecules having a particular cyclic enolone structure are stabilised by complexation with alkaline earth metal ions. These complexes are stable until exposed to certain conditions of temperature and/or moisture.

21 Claims, 1 Drawing Sheet